Sept. 3, 1963 A. R. FOSBERG 3,102,569
APPARATUS FOR HULLING SEEDS
Filed March 30, 1959
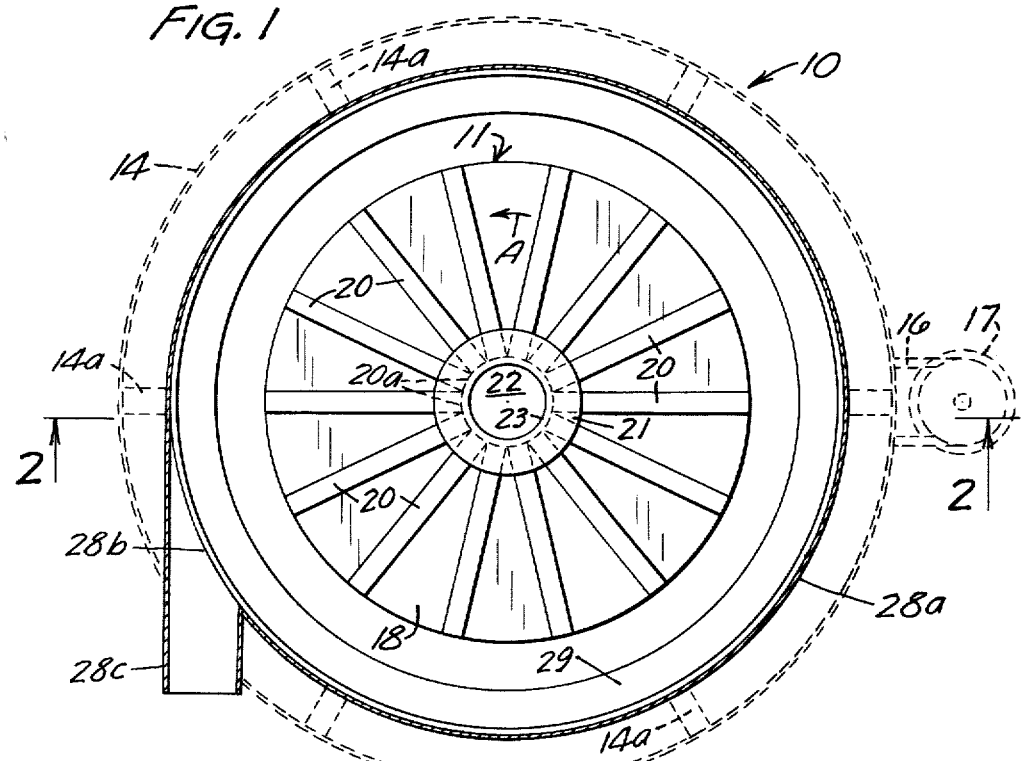
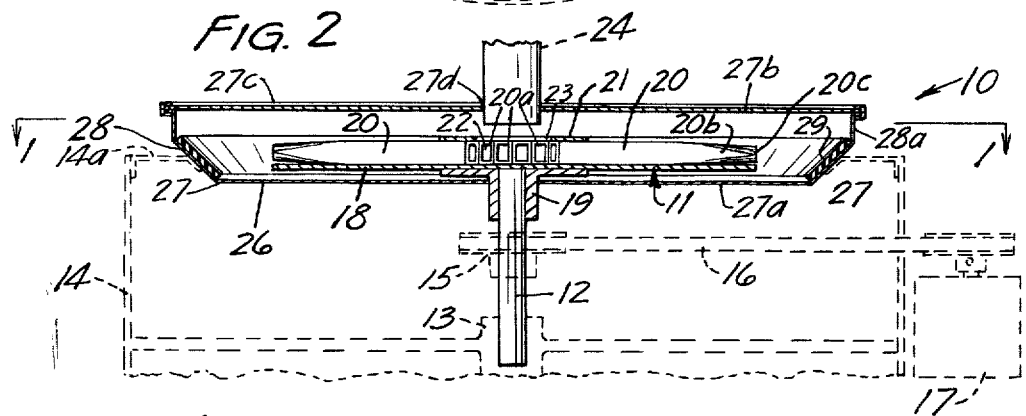
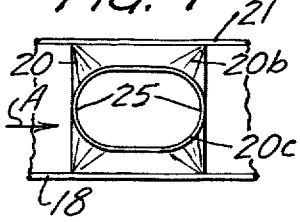
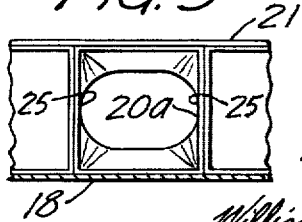
INVENTOR
ARTHUR R. FORSBERG
BY
Williamson, Schroeder & Palmatier
ATTORNEYS 3,102,569
APPARATUS FOR HULLING SEEDS
Arthur R. Forsberg, Thief River Falls, Minn.
Filed Mar. 30, 1959, Ser. No. 802,853
4 Claims. (Cl. 146—253)

This invention relates to the method of and apparatus for removing the hulls from the kernels of elongate-type seeds.

An object of my invention is to provide a new and improved apparatus of simple and inexpensive construction and operation for removing the hulls from the kernels of elongate-type seeds.

Another object of my invention is to provide a novel method of efficiently removing the kernels from the hulls of elongate-type seeds such as oats, rice and sunflower seeds and the like.

Another object of my invention is to provide a novel and improved apparatus for orienting elongate seeds in one direction and propelling the seeds in said direction and subsequently retarding movement of the hulls and permit the kernels of the rapidly traveling seeds to break through the hulls in an endwise direction.

These and other objects and advantages of my invention will more fully appear from the following description made in connection with the accompanying drawings wherein like reference characters refer to the same or similar parts throughout the several views and in which:

FIG. 1 is a horizontal section view of the present invention take on a plane indicated at approximately 1—1 in FIG. 2 with the supporting framework therefor shown in dotted lines;

FIG. 2 is a section view taken on a vertical plane substantially at 2—2 in FIG. 1, and showing in dotted lines the supporting framework.

FIG. 3 is an enlarged detail end elevation view of the inner end of one of the seed-guiding tubes, and FIG. 4 is a detail end elevation view of the outer end of one of the seed-guiding tubes.

One form of the present invention is shown in the drawings and is described herein.

The impact huller is indicated in general by numeral 10 and includes a rotor, indicated in general by numeral 11 mounted on a shaft 12 which, in the form shown, is vertically oriented, and which shaft is mounted in suitable bearings 13 which are supported from the frame structure 14. The shaft 12 is connected with a suitable source of high speed rotary power, and in the form shown the shaft has a pulley 15 affixed as by keying thereto and having a belt 16 trained therearound to be driven by a motor or other suitable driving medium 17. The rotor 11 includes a plate 18 oriented transversely of the rotation axis and secured to the end of shaft 12 by means of a flanged coupling 19.

A plurality of grain guides or tubes 20 are radially oriented in a ring around the rotation axis and suitably affixed as by spot welding to the plate 18 and to an overlying retaining ring 21 which projects radially inwardly slightly from the inner ends 20a of the tubes 20. It will be noted that the inner ends 20a of the tubes are rectangular, and more specifically square, in configuration, and are disposed in side-by-side relation with each other around the rotation axis and cooperate with the plate 18 and ring 21 to define a seed-receiving enclosure 22 with an opening at 23 through the center of the ring 21 for receiving seeds or grain from the depending end of the supply tube or conduit 24 which conveys the seeds or grain into the enclosure 22 from a suitable source such as a hopper or bin for seeds. The outer end portions 20b of the tubes 20 are convergently tapered toward the outer terminal ends 20c of the tubes and the tapering outer end portions, including the terminal ends, are oval-shaped as is seen in FIG. 4. It will be noted than the longer dimension of the oval or oblong-shaped outer end portion of each of the tubes 20 extends in a direction transversely of the rotation axis. If the rotor is driven in the direction of arrow A, the sharply rounded concave surface portion 25 of each of the radial tubes or guides 20 will face in the forward direction of rotation of the rotor, and the seeds traveling radially outwardly through the tube 20 will slide along this sharply curved concave surface portion and be oriented in a radial direction as the seed is being impelled in a radial direction due to centrifugal force.

The impact huller 10 also includes an impact ring 26 disposed in concentric relation with the rotation axis and outwardly around the rotor 11. The impact ring 26 may be mounted on a circular housing 27 which may be secured to the frame structure 14 by means of brackets 14a. The ring 26 is generally conical in configuration and disposed radially outwardly from the ends of the rotor tubes 20. The ring 26 has an inner friction surface 29 oriented at an oblique angle with respect to the rotation axis and in the form shown the ring is constructed of a hard rubber strip secured to the lower and generally conical portion 28 of the housing 27. Although the ring 26 is resilient in the form shown, this ring could be made of a hard material such as steel with a friction surface 29, and may be changed, dependent upon the type of material being hulled by the machine.

The housing 27 has a closed bottom 27a, and a closed top defined by a removable cover 27b which is secured at its periphery to the sidewall rim flange by means of a split ring 27c. The cover 27b has an opening 27d therein to receive the supply tube or conduit 24 therethrough. The upper portion 28a of the housing 27 has an outlet opening 28b therein which connects to a tangentially oriented discharge tube 28c which may be connected to a suitable collecting medium or other processing apparatus for separating the seeds from the hulls which have been removed from the individual seeds, but which are still intermingled with the seeds or kernels at the time of discharge.

In operation, the rotor 11 will be revolved at a high rate of speed and seeds of any one of a number of types of elongate seeds, such as oats, tame rice, sunflower seeds or the like, will be supplied downwardly through the conduit 24 into the enclosed area 22, whereupon, when the seeds engage the plate 18 they will move into the inner square ends 20a of the tubes 20, and by centrifugal force will be rapidly impelled in a radial outward direction through the tubes. As the seeds pass outwardly through the tubes, they tend to string out and will be oriented as they slide along the sharply concave forwardly facing surface 25 so that each of the elongate seeds extends in a radial direction. It will be understood that the seeds pass outwardly through the tubes at an extremely high rate of speed and they are flung radially outwardly in this particular orientation against the impact ring whereupon, when a seed engages the surface 29, the frictional relation between the hull and the surface 29 retards the movement of the hull and because the seed is oriented in a generally radial direction, the kernel will easily break through the end of the hull and slip out of the hull and be deflected upwardly from the surface 29. It has been experienced that the kernels are not damaged whatsoever in this hulling operation and therefore there is no spoilage caused by the operation of the machine.

After the kernel has been separated from its hull, the kernel and hull are swirled around inside the housing by means of the moving air which carries the kernels and hulls around the periphery of the housing 27 and the intermingled kernels and hulls will be discharged through the opening 28b and the discharge conduit 28c.

It has been experienced in the operation of this machine that exceedingly good and efficient cleaning of kernels is obtained. It has been experienced that when oats are being hulled by means of this machine, the kernels discharged are substantially clean of the hairs which are always present on each kernel in its natural state. The exact reason as to why the hairs are removed by this machine is not clearly understood, but the fact remains that the hairs are removed. To my knowledge, this has not been accomplished by any previous machine used for hulling.

It has further been shown that with the same amount of horsepower applied to the machine, the present machine has approximately twice the capacity of any previously known machine. Another important feature of this present machine is that the breakage of the seeds and kernels is materially reduced. Whereas with other known machines, a breakage of 5% of the seeds and kernels has been regarded as exceedingly good, in the present machine breakage of under 3% is regularly obtained.

It is believed well to consider a specific example of a construction in order to understand the effectiveness of the operation. In a relatively small machine, wherein the rotor is approximately sixteen inches in diameter, the rotor will be driven at speeds in the approximate range of 1000 to 2000 r.p.m. for most types of seeds. The inner ends of the tubes 20 of such a machine may be approximately one inch square and seeds may be processed at a rate of up to two hundred bushels per hour with 98% hulling in a single operation. Adequate power is provided by a two-horsepower motor. The rotor will be operated at various speeds for various types of grain and seeds to be hulled. For instance, the rotor will be driven at approximately 2000 r.p.m. when processing such grains as oats, tame rice and the like, and it has been found successful to operate the rotor at about 1200 r.p.m. when hulling sunflower seeds.

As a part of the present invention, I have developed a new method of hulling seeds which includes the driving of the seeds at a high velocity, orienting the seeds to extend longitudinally of their direction of movement, and then retarding the movement of the hulls to permit the seed kernels to pass endwise through the hull and separated therefrom.

It will be understood that after the hulls have been removed from the kernels, the kernels will require cleaning in order to physically separate all of the hulls from the seeds.

It will, of course, be understood that various changes may be made in the form, detail, arrangement and proportion of the parts without departing from the scope of my invention which consists of the matter described herein and set forth in the appended claims.

What I claim is:

1. Apparatus for removing the hulls from the kernels of elongate seeds, comprising a rotor, means revolving the rotor at high speed, the rotor having a plurality of substantially radially extending tubes having outer end portions being ovate in cross section, the longer dimension of the ovate shape extending in a direction transversely of the rotation axis whereby to axially orient the elongate seeds as the same are axially propelled through the tubes, the rotor having means adjacent the center thereof for supplying seeds into the tubes, and an impact ring around the rotor and having a continuous inner surface facing obliquely endwise of the rotor axis for engaging the hulls of the axially oriented and axially impelled elongate seeds to retard movement of the hulls and permit the kernels to break through the hulls in an endwise direction and be deflected from said surface.

2. The invention set forth in claim 1 wherein the rotor has means including the open inner ends of said tubes defining an enclosure opening in one axial direction of the rotor for receiving seeds and supplying the same into the inner ends of the tubes.

3. Apparatus for removing the hulls from the kernels of elongate seeds, comprising a rotor, means revolving the rotor at high speed, the rotor having a plurality of substantially radially extending seed-guiding tubes with open inner ends adjacent each other around the rotor and spaced from the rotation axis for receiving seeds therein, the tubes having outer end portions progressively tapering to an oval shape, the longer dimension of the oval tube shapes being oriented transversely of the rotation axis whereby the tubes will radially orient the elongate seeds as the same are impelled radially at high velocity, and an impact ring around the rotor and having a continuous inner friction surface facing obliquely endwise of the rotor axis for engaging the hulls of the radially oriented and radially impelled seeds and to retard movement of the hull to permit the kernel to break through the hull in an endwise direction and be deflected from said surface.

4. Apparatus for removing the hulls from the kernels of elongate seeds, comprising a rotor on a vertical axis, means revolving the rotor at high speed, the rotor having a plurality of substantially radially extending seed-guiding tubes with rectangular open inner ends disposed adjacent each other in side-by-side relation and spaced from the rotation axis for receiving seeds therein, a seed-supporting plate on the rotor and underlying the open inner ends of said tubes for applying seeds therein, the tubes having outer end portions progressively tapering to an oval shape, the longer dimension of the oval shape extending transversely of the rotation axis whereby the tubes will radially orient the elongate seeds as the seeds are impelled radially through said outer end portions at high velocity and impact ring around the rotor and having a continuous inner friction surface facing obliquely endwise of the rotor axis for engaging the hulls of the radially oriented and radially impelled seeds and to retard movement of the hull to permit the kernel to break through the hull in an endwise direction and be deflected from said surface.

References Cited in the file of this patent

UNITED STATES PATENTS

| | | |
|---|---|---|
| 704,610 | Black | July 15, 1902 |
| 758,665 | Kimball | May 3, 1904 |
| 807,990 | Ball | Dec. 19, 1905 |
| 1,427,457 | Gillespie | Aug. 29, 1922 |
| 1,484,563 | Riddle | Feb. 19, 1924 |
| 2,352,327 | Kirn | June 27, 1944 |
| 2,667,197 | Giles | Jan. 26, 1954 |

FOREIGN PATENTS

| | | |
|---|---|---|
| 155,191 | Australia | Feb. 10, 1954 |

OTHER REFERENCES

Ser. No. 355,397, Nyiri (A.P.C.), published May 4, 1943.

UNITED STATES PATENT OFFICE
CERTIFICATE OF CORRECTION

Patent No. 3,102,569                 September 3, 1963

Arthur R. Forsberg

It is hereby certified that error appears in the above numbered patent requiring correction and that the said Letters Patent should read as corrected below.

Column 4, line 37, for "applying" read -- supplying --.

Signed and sealed this 25th day of February 1964.

(SEAL)
Attest:
ERNEST W. SWIDER                 EDWIN L. REYNOLDS

Attesting Officer                 Acting Commissioner of Patents